June 28, 1932.  T. M. EYNON  1,864,991
LIQUID LEVEL INDICATOR
Filed Aug. 8, 1922
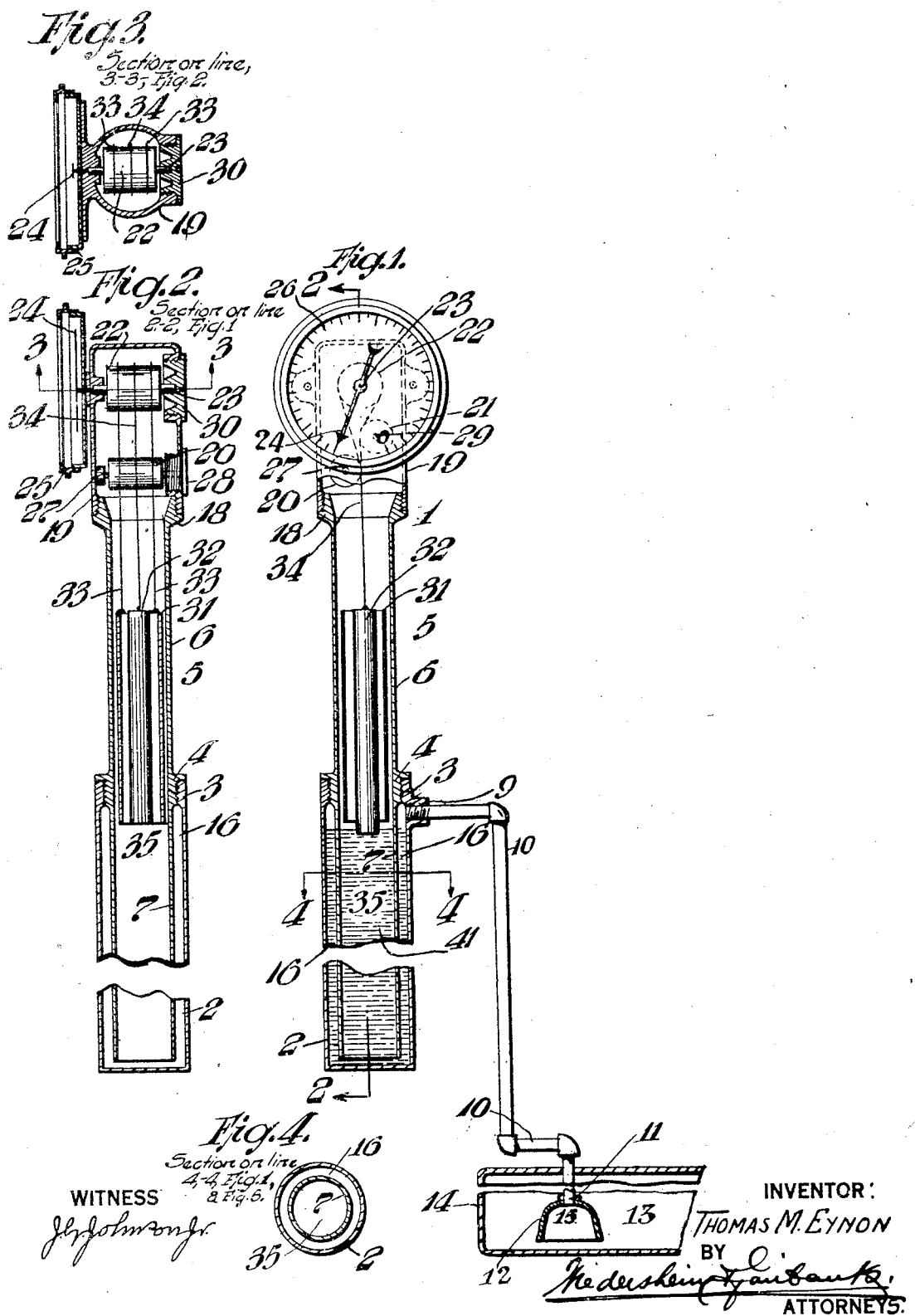
INVENTOR:
THOMAS M. EYNON
BY
ATTORNEYS.

Patented June 28, 1932

1,864,991

UNITED STATES PATENT OFFICE

THOMAS M. EYNON, OF PHILADELPHIA, PENNSYLVANIA

LIQUID LEVEL INDICATOR

Application filed August 8, 1922. Serial No. 580,401.

My invention relates to a novel gasoline or other liquid indicator which can be readily installed upon automobiles or other self propelled vehicles or upon tanks of any standard or conventional type without change therein, whereby the height or level of the gasoline or other liquid will be visually indicated with great accuracy at the desired point through the agency of a liquid medium, whereby the use of rods, links and other mechanical connections between the gasoline tank and the indicator is entirely dispensed with, means being employed for conducting variations of pressure in the gasoline tank to a pair of concentric chambers communicating at their bottoms and containing a liquid, and provided with a float and a counterweight which are connected to suitable indicating devices, which in the case of an automobile may be arranged on the instrument board or in proximity thereto, said float and counterweight being actuated by the change of the level of the liquid in said chambers.

My invention further consists of other novel features of construction and advantage, all as will be hereinafter fully set forth.

For the purpose of illustrating my invention, I have shown in the accompanying drawings forms thereof which are at present preferred by me, since they will give in practice satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a vertical sectional view of one form of the indicator mechanism, showing the float and counterweight of unequal volumes and of unequal weights positioned in tubes arranged concentrically, the connection from the indicating devices to the pressure chamber within the gasoline or other tank being also shown, certain of the parts being shown in elevation.

Figure 2 represents a vertical section on line 2—2 Figure 1, certain parts being shown in elevation.

Figure 3 represents a horizontal section on line 3—3 Figure 2.

Figure 4 represents a horizontal section on line 4—4 Figure 1.

Similar numerals of reference indicate corresponding parts.

Referring to the drawings:

Referring first to Figure 1, 1 designates my novel construction of gasoline or other liquid indicator, the same comprising a lower cup-shaped member or outer tube 2, which is closed at its bottom and open at its top, said top being internally threaded at 3 and being engaged by the externally threaded portion 4 of the tubular member 5, which is composed of the upper tube 6 and the lower tube 7, the latter being open at its bottom and arranged concentrically within the outer tube 2. The bottom of the tube 7 is slightly raised above the bottom of the tube 2.

The outer tubular member 2 is threaded at 9 for the reception of the upper terminal of the pipe 10, whose other or lower terminal 11 communicates with the inverted cup-shaped chamber or bell 12, which is adapted to be immersed in the gasoline or other liquid 13 in the tank 14, said bell having the pressure chamber 15 in the upper portion thereof.

By reason of the manner of assembling the members 2 and 7, it will be seen that an annular chamber 16 is formed therebetween, into which variations of pressure are conveyed through the pipe 10 to the top of the liquid in the chamber 16 and thence to the float chamber 35.

The upper portion of the inner tubular member 6 is provided with a head 18 on which is threaded the lower portion of the upper housing or casing 19, the latter having the lower pulley or roller 20 mounted therein, above which is the upper pulley or roller 21 arranged out of vertical alignment with the pulley 20, above which is the centrally disposed roller 22, which is mounted on the shaft 23, which carries the pointer or finger 24, which is contained within the housing 25 carried by casing 19 and is provided with the stationary scale 26, the rollers 20 and 21 serving as idlers.

The pulley 20 is mounted on the shaft 27, whose ends revolve in suitable bearings, and for convenience of assembling, I mount one end of said shaft, as the right-hand end seen in Figure 2, in the externally threaded plug or closure 28, it being apparent that the shaft 29 of the upper pulley or roller 21 may be similarly mounted, while the shaft 23 of the roller 22 is similarly mounted in the externally threaded plug or closure 30. By this arrangement the rollers 20, 21 and 22 are readily accessible from the exterior of the housing 19 for the purposes of adjustment, inspection, replacement or repair.

31 designates a cylindrical counterweight open at both its ends, and within which is free to move the float 32, which is closed at both its upper and lower ends. The weight of the counterweight 31 is less than the weight of the float 32. The counterweight 31 is suspended from the cords 33 while the float 32 is suspended from the cord 34, said cords 33 and 34 being wound around the pulley 22 in opposite directions and secured thereto, and being guided by the idlers 20 and 21.

35 designates a chamber which is filled with any suitable liquid which will not readily freeze or evaporate, the level of said liquid rising and falling concommittently with the rise and fall of the level of the gasoline in the tank 14, with which it is connected by the pipe 10, the other end of which communicates with chamber 15 in the bell 12, in the manner above set forth, to actuate the float 32 and counterweight 31, which in turn actuate the indicator 24, which is adapted to indicate the amount of gasoline in the tank by any suitable graduations. The operation is as follows:

As the level of the liquid in the chamber 35 rises with the rise of the gasoline in the chamber 15, the lower ends of the float 32 and counterweight 31 are both submerged in said liquid. Due to the fact that said counterweight weighs slightly less than said float and due to the fact that the float is closed at its bottom end, and the counterweight is open at its bottom end, said float will tend to displace a larger volume of liquid than that displaced by an equal length of said counterweight, with the result that the float 32 tends to move upwardly while the counterweight 31 tends to move downwardly. This unbalances the float and counterweight and results in a movement of the pointer 24, it being understood that when the tank 13 is empty as is the case in the illustration shown in Figure 1 of the drawings, and the level of the liquid in the chamber 35 is at its lowest, the float 32 is partly submerged in or in contact with the liquid in the chamber 35 and is thus "balanced" with the counterweight 31, to bring the pointer 24 to the "zero" position as shown in Figure 1.

It will be understood that the liquid in the chambers 16 and 35 may preferably be of vegetable oil which does not readily freeze or evaporate; however, other liquids having the same or equivalent physical properties or characteristics may be employed.

While I have designed my novel indicator particularly for use in automobiles or other self-propelled vehicles, since the same is capable of being readily installed thereon, without any change or dismantling of any of the standard automobile units, it will be apparent that the broad principle of my invention is applicable to stationary tanks or for indicating the height or variations of level of other liquids than gasoline, and it will be understood that in its broad adaptation, my invention is applicable as an indicator for indicating the variations in level of any other liquid than gasoline, and is equally capable of adaptation to any tank containing such liquid, for the purpose specified.

It will be apparent that my invention being operated solely by variations of pressure within the ball chamber will be entirely automatic in its operation, and that it dispenses entirely with floats in the gasoline chamber and with all mechanical connections intermediate said float and the indicating devices, so that there is no liability of the apparatus getting out of order after being installed in position, and owing to its great simplicity and the absence of any mechanical connections, it can be readily installed in any standard automobile without the employment of skilled labor and without dismantling or taking down of any of the standard automobile units, it being immaterial whether the gasoline tank is located at the rear of the automobile, or in any other position upon the chassis.

Having thus described my invention, what I claim as new and desire to secure by Letters Patent is:

A gauge for indicating the level of liquid within a tank, comprising a bell shaped member disposed near the bottom of said tank and forming an air chamber, a chamber having a liquid therein, a second chamber communicating with said first chamber at the bottom thereof, a pipe leading from the top of said second chamber to the top of said bell shaped member, an open ended hollow counterweight, a float closed at its bottom and disposed within said counterweight, flexible members from which said counterweight and said float are suspended within said first mentioned chamber whereby the relative positions of said float and said counterweight may be varied by the rise and fall of the liquid in said first mentioned chamber due to a change in the level of the liquid in said tank, and an indicating device operatively connected to and adapted to be actuated by said flexible members to indicate in volumetric units the change in the relative positions of said counterweight and said float.

THOMAS M. EYNON.